United States Patent [19]

Rosenthal et al.

[11] 3,873,587
[45] Mar. 25, 1975

[54] PRODUCTION OF PEROXYTITANIUM COMPLEXES FROM ORGANIC HYDROPEROXIDES

[75] Inventors: Rudolph Rosenthal, Broomall; Giovanni A. Bonetti, Wynnewood; Joseph A. Kieras, Lincoln University, all of Pa.

[73] Assignee: Atlantic Richfield Company, Los Angeles, Calif.

[22] Filed: Aug. 20, 1973

[21] Appl. No.: 390,152

[52] U.S. Cl. .......................... 260/429.5, 252/431 R
[51] Int. Cl. .............................................. C07f 7/28
[58] Field of Search ............... 260/429.5; 252/431 R

[56] References Cited
UNITED STATES PATENTS

| | | | |
|---|---|---|---|
| 2,895,919 | 7/1959 | Gerhart | 252/430 |
| 3,181,991 | 5/1965 | Leveskis | 252/430 |
| 3,458,546 | 7/1969 | Dannley et al. | 260/429.5 X |
| 3,507,809 | 4/1970 | Kollar | 252/431 R |

OTHER PUBLICATIONS

Satterfield et al., Analytical Chemistry, Vol. 27, pp. 114–1175 (1955).

MacNevin et al., Analytical Chemistry, Vol. 25, pg. 1760, (1953).

Primary Examiner—H. Sneed
Attorney, Agent, or Firm—Delbert E. McCaslin

[57] ABSTRACT

Method for the production of peroxytitanium complexes by reacting titanium sulfate or a titanium compound convertible to the sulfate with an organic hydroperoxide at a pH below about 1.5. These complexes are useful oxidizing agents.

9 Claims, No Drawings

PRODUCTION OF PEROXYTITANIUM COMPLEXES FROM ORGANIC HYDROPEROXIDES

BACKGROUND OF THE INVENTION

It has been well established in the technical literature that hydrogen peroxide reacts with titanium compounds to form peroxytitanium complexes which can be used for the analytical determination of either hydrogen peroxide or titanium. The color formed by reaction of titanium (IV) and hydrogen peroxide is the basis for the colorimetric determination. It is also reported in the literature, however, that organic hydroperoxides do not give a test with titanium compounds and therefore do not give the peroxytitanium complexes. This fact is employed as the basis for the separation of hydrogen peroxide from organic hydroperoxide solutions wherein the titanium (IV) ion is used to complex with the hydrogen peroxide in alkaline solution (ammonium hydroxide) giving a yellow precipitate of the complex as shown by MacNevin et al, Analytical Chemistry, Volume 25, page 1760 (1953). These investigators separated hydrogen peroxide from aqueous mixtures of various organic hydroperoxides such as 1-ethylpropyl hydroperoxide, tertiary butyl hydroperoxide, 3-cyclohexenyl hydroperoxide, cyclohexyl hydroperoxide, and 1,1,4,4-tetramethylpentyl hydroperoxide.

The colorimetric determination of titanium by the use of hydrogen peroxide is described by Satterfield et. al., Analytical Chemistry, Volume 27, page 1174 (1955). They reported that their procedure using titanium sulfate was tested on tertiary butyl hydroperoxide alone and on its mixtures with hydrogen peroxide in an acetic acid-water solvent and found that only the hydrogen peroxide was detected.

It now has been found, contrary to these teachings of the prior art, that it is possible to react either solid titanium sulfate or an aqueous slurry of titanium sulfate with organic hydroperoxides to produce peroxytitanium complexes at high conversions and selectivities. This surprising discovery is extremely important since these complexes are useful oxidizing agents, for example, P. Faber in Zeitschrift Analyt. Chem, 46, p. 277 (1907) shows over 25 different reactions whereby these complexes can be used as oxidants. They have not attained widespread use, however, since heretofore the only known method of producing these complexes was by the use of hydrogen peroxide which is a very expensive commercial reagent.

In view of current ready availability and relatively low cost of organic hydroperoxides prepared by the direct oxidation of hydrocarbons with molecular oxygen, either air or oxygen, this discovery makes the peroxytitanium complexes available at a far lower cost than by producing them from the expensive hydrogen peroxide.

There is an additional advantage for the instant method, namely, when organic hydroperoxides are used they are reduced to the alcohol corresponding to the hydroperoxide. These alcohol co-products have many commercial uses. For example, if tertiary butyl hydroperoxide is employed, the co-product is tertiary butyl alcohol which is a highly desirable compound for addition to gasoline to improve its octane number without being a pollutant and in addition is valuable as a de-icing agent for the carburetor. Tertiary butyl alcohol also can be readily dehydrated to isobutylene a useful monomer in polymer production. Similarly if ethylbenzene hydroperoxide is employed the alcohol can be dehydrated to styrene, another useful monomer. The same applies to the other organic hydroperoxides, thus not only is the original reagent inexpensive, but in addition to producing the peroxytitanium complex, it also produces a valuable co-product. The hydrogen peroxide on the other hand produces water as its co-product.

SUMMARY OF THE INVENTION

In accordance with this invention an organic hydroperoxide is reacted either with solid titanium sulfate having the formula $TiOSO_4 \cdot H_2SO_4 \cdot 8H_2O$ or an aqueous slurry of such compound at a pH below 1.5 preferably under extremely acidic conditions, i.e. at a pH as low as essentially 0. The reaction is carried out at moderate temperatures, i.e. not below 0° or above 100° C. and the peroxytitanium complexes can be obtained as solids, water solutions, or as coatings on supports such as silica gel or alumina.

It is an object of this invention, therefore, to provide a novel method for the production of peroxytitanium complexes.

It is another object of this invention to provide a method for the production of peroxytitanium complexes utilizing organic hydroperoxides.

It is another object of this invention to provide a method for the production of peroxytitanium complexes utilizing inexpensive reagents with the production of valuable co-products.

Other objects of this invention will be apparent from the description which follows and from the claims.

DESCRIPTION OF THE INVENTION

The starting titanium compound is preferably the commercially available titanium sulfate having the formula $TiOSO_4 \cdot H_2SO_4 \cdot 8H_2O$. This is sometimes written as $Ti(SO_4)_2 \cdot 9H_2O$. Irrespective of the molecular formula the titanium is in the (IV) state. As shown in the literature other titanium compounds can be converted to the sulfate, for example the titanium oxide can be reacted with sulfuric acid to produce the sulfate, but since the sulfate is readily available commercially it is preferred as the source of the titanium (IV) ion.

The organic hydroperoxides preferred are those having the general formula ROOH wherein R is an alkyl, aralkyl or cycloalkyl radical. Such radicals may also be substituted with other non-reactive groups such as the halogens, nitro groups and the like. Preferably those hydroperoxides having from 4 to 12 carbon atoms are preferred, in particular, tertiary butyl hydroperoxide, tertiary amyl hydroperoxide, ethylbenzene hydroperoxide, cyclohexyl hydroperoxide and cumene hydroperoxide. Other hydroperoxides such as 1,2,3,4-tetrahydronaphthalene hydroperoxide and di-isopropyl ketone hydroperoxide also can be used but are less preferred. In general those hydroperoxides most readily available commercially and whose corresponding alcohols are commercially useful either as such or when dehydrated to a polymerizable monomer are preferred.

The hydroperoxide can be pure or it can be in the form of the crude oxidate as obtained by the aforementioned thermal oxidation of the corresponding hydrocarbon using molecular oxygen in the absence of catalysts, most generally. Likewise oxidates which have been concentrated by removal of unreacted hydrocarbon and a portion or preponderance of the other oxygenated products can be used.

As has been discussed prior art workers in this field had employed either alkaline conditions or slightly acidic conditions (acetic acid-water) systems and had found that there was substantially no reaction of organic hydroperoxides with titanium compounds. It is a critical feature of this invention that the reaction be carried out at a pH below about 1.5, preferably at a pH below 1.0 and most preferably below a pH of 0.8. It has been found that the highest conversions in the shortest times are in the pH range of from 0 to 0.4. Thus the objects of this invention are achieved in a highly acidic medium.

The reaction can be carried out in a temperature range between the freezing point (0° C.) and boiling point (100° C.) of the water but preferably temperatures below about 85° C. are employed since some decomposition of the peroxytitanium complex occurs above this temperature. The most preferred temperature is in the range of from about 20° to 80° C.

Atmospheric pressure is preferred although subatmospheric or superatmospheric pressures can be used but offer no particular advantage.

In the small scale runs shown in the Examples which follow only batch reactions were employed, however, the reaction is readily adaptable to continuous operation.

In the reactions described in the aforementioned prior art, the peroxytitanium complexes were yellow to orange in color. The complexes produced herein are reddish in color and contain one titanium atom for each active oxygen atom. The structure of the peroxytitanium complexes produced by the use of hydrogen peroxide under various conditions has been discussed in the literature for many years, one of the more recent papers which mentions, inter alia, the complex containing one titanium atom for each active oxygen atom being by Mühlebach et. al., Inorganic Chemistry, v. 9, p. 2381 (1970).

Accordingly in the instant invention the preferred mole ratio of the titanium sulfate to organic hydroperoxide is 1:1.

However, other mole ratios such as 1:10 to 10:1 could be used but are not attractive from an economic standpoint since the reagent in excess would have to be recovered and re-used.

The peroxytitanium complex can be produced by reaction of the organic hydroperoxide with the titanium sulfate in the absence of added water. It has been found, however, because of the physical characteristics of such a mixture, i.e. a pasty material difficult to handle, it is preferable to carry out the reaction in the presence of added water. It has been found that weight ratios of tatanium sulfate to water of 1:1 to 1:3 give excellent results, with nearly as good results being obtainable up to 1:5. Ratios of 1:10 and 1:20 are within the operative range but are also at the upper end of the pH range and therefore in the less preferred range as will be shown in the Examples. Amounts of water less than the 1:1 weight ratio also can be used, i.e. amounts sufficient to reduce the pasty characteristics of the mixture, for example a weight ratio of the titanium sulfate to water of 1:0.2, but since the aforementioned ratio of 1:1 is a convenient and readily controllable amount it is completely satisfactory.

The reaction time is dependent both upon temperature and pH parameters. The lower the pH of the medium the shorter the time required to obtain a particular yield of the complex. Likewise when temperatures toward the higher end of the preferred range are employed shorter times can be used. Thus by using both a high temperature and a very low pH solution high conversions can be obtained in times as short as 15 minutes. Generally, however, from 45 minutes to 1 hour is employed. The maximum length of time can be several days at ambient temperatures whereby very high yields of the peroxytitanium complex, i.e. 98 percent or higher, can be obtained. For practical purposes, however, the temperature and pH should be selected such that the yield desired, for example, 90 percent or above, is obtained in at least 5 to 6 hours. The shorter times are desirable since organic hydroperoxides decompose to a degree if held at elevated temperatures for excessively long times and thus are not available for reaction with the titanium.

The Examples which follow are provided for the purpose of illustrating the invention in additional detail but are not to be construed as limiting.

EXAMPLE I

In order to demonstrate the effect of pH on the conversion of titanium sulfate (the commercial compound $TiOSO_4 \cdot H_2SO_4 \cdot 8H_2O$) to the peroxytitanium complex using commercial tertiary butyl hydroperoxide (92 weight percent purity) as the organic hydroperoxide a number of runs were carried out all at 60° C. with the pH being adjusted by varying the amount of water added to the reactants.

To a suitable glass reactor flask provided with a thermometer, stirrer, condenser and heater were added 1.2 g of 92 weight percent tertiary butyl hydroperoxide (0.012 moles) and 5 g of the titanium sulfate (0.012 moles) as a slurry in the water. The amounts of water are shown in Table I together with the pH, measured with standard pH papers, and the amount of conversion, i.e. yield, to the complex after various reaction times. The peroxytitanium complex was determined by ultra-violet spectrographic analysis and in all runs in this Example and in the other Examples. The co-product when tertiary butyl hydroperoxide was employed was always tertiary butyl alcohol determined by gas-liquid phase chromatography.

The yield of the complex was based on the amount of the original starting reagents, a 1:1 mole ratio of titanium sulfate and hydroperoxide being employed. The results are shown in Table I.

TABLE I

| Run No. | Water Used grams | pH | Time Hours | Mole per cent Yield of Complex |
|---|---|---|---|---|
| 1a | 5 | 0 | 1.5 | 91 |
| 2a | 15 | 0.4 | 2 | 71 |
| 2b | 15 | 0.4 | 3 | 80 |
| 2c | 15 | 0.4 | 4 | 90 |
| 2d | 15 | 0.4 | 5 | 99 |
| 3a | 25 | 0.6 | 2.5 | 42 |
| 3b | 25 | 0.6 | 4 | 59 |
| 4a | 50 | 0.8 | 2 | 21 |
| 4b | 50 | 0.8 | 4 | 30 |
| 4c | 50 | 0.8 | 6 | 36 |
| 5a | 100 | 1.0 | 4 | 10 |
| 5b | 100 | 1.0 | 20.5 | 22 |

If the yield obtained after 4 hours reaction time (Run Nos. 2c, 3b, 4b, and 5a) is plotted against pH of the reaction medium an almost perfect linear relation is obtained so that if such line is extrapolated it shows that at a pH of about 0.3 after 4 hours at 60°C. essentially 100 percent conversion is obtained while at a pH of about 1:1 after 4 hours there would be essentially no conversion. The data also show that if the pH is essentially zero, i.e. very highly acidic as in Run No. 1a the same yield of complex is obtained in 1.5 hours as at a pH of 0.4 in 4 hours. Likewise in Run No. 2d where a pH of 0.4 was employed with a reaction time of 5 hours essentially all the reagents were converted to the complex while at a pH of 1.0 even after 20.5 hours only 22 percent yield is obtained. If Run Nos. 4a and 5b are compared the marked increase in time with increase in pH is apparent. Thus to achieve about a 20 percent yield, which shows operability but not practicability, at the upper limit of the pH range, i.e. about 1.5, at least three or four days reaction time would be required.

Increased reaction temperature also can be employed to give high yields in shorter times particularly in the pH range below about 0.4 to 0.6, i.e. in the most preferred range.

EXAMPLE II

A run carried out identical to the Run No. 2 series of Example I, i.e. 5 g titanium sulfate (0.012 moles) slurried in 15 g of water (pH of mixture was 0.4) was reacted with 1.2 g of 92 weight percent tertiary butyl hydroperoxide (0.012 moles) for 1 hour at 75° C. There was obtained a 95.3 mole percent yield of the peroxytitanium complex. Thus a yield was obtained which was better than in Run No. 2c (4 hours at 60° C.) and almost equal to the yield of Run No. 2d (5 hours at 60° C.). This shows that if a pH of essentially zero as in Run No. 1a were employed with a temperature at the high end of the preferred range i.e. 75° to 80° C. extremely short times of the order of 15 minutes could be employed to give essentially 100 percent yield. This is extremely practical also since with the short times even at the high end of the temperature range the hydroperoxide can react to form the complex instead of decomposing before it can react.

EXAMPLE III

In order to demonstrate that low temperatures can be employed if low pH's are also employed, two runs were carried out in the same manner as the series designated as Run No. 2 of Example I, i.e. 5 g titanium sulfate slurried in 15 g of water with 1.2 g of the 92 weight percent tertiary butyl hydroperoxide being the reagents employed.

In the first run the mixture was heated for 5.5 hours at 40° C. and analysis showed that a 53 mole percent yield of the peroxytitanium complex had been produced. This compares with a yield of 99 mole percent in 5 hours at 60° C., Run No. 2d of Example I. The mixture was allowed to stand at ambient temperature overnight, i.e. at about 70° F. (21° C.) for about 16 hours. Analysis at this time showed a yield of 69 mole percent had been attained. The mixture was then allowed to stand an additional three days at ambient temperature and a yield of 98 mole percent was reached.

A second run was carried out in the same manner except that the mixture was simply stirred at ambient temperature for 4 hours. A 16 mole percent yield of the peroxytitanium complex was obtained. This can be compared with Run No. 2c of Example I wherein a temperature of 60° C. gave a 90 mole percent yield. These runs do demonstrate, however, that ambient temperatures are operable if low pH's are employed for a sufficient length of time.

In order to demonstrate that a commercially available source of organic hydroperoxide is suitable for the method of this invention 2 additional runs were carried out wherein tertiary butyl alcohol was present, in the second run an isobutane oxidation product was employed which contained the tertiary butyl alcohol.

EXAMPLE IV

A mixture of 5 g titanium sulfate (0.012 moles), 15 g of water and 2.2 g of a solution containing 49 weight percent tertiary butyl hydroperoxide (0.012 moles) and 51 weight percent tertiary butyl alcohol was heated at 50° C. for 17 hours. Analysis showed that an 89 mole percent yield of the peroxytitanium complex had been obtained.

EXAMPLE V

A mixture of 5 g titanium sulfate (0.012 moles), 15 g of water and 2.79 of an isobutane oxidation product containing 41.7 weight percent tertiary butyl hydroperoxide (0.012 moles) was heated at 60° C. for 7 hours. A 77 mole per cent yield of the peroxytitanium complex was obtained. After standing overnight at ambient temperature the yield increased to 84 percent. The isobutane oxidation was typical of the crude product obtained by the commercial oxidation of isobutane. Commercially, isobutane is thermally oxidized in the liquid phase at a temperature conveniently in the range of from 200° to 300° F. under pressures of 300 psig to 700 psig utilizing molecular oxygen which can be in the form of air, but generally is essentially pure oxygen. The isobutane is preferably pure, however, small amounts of other hydrocarbons such as benzene or lower paraffins can be tolerated. This commercial process is well known to the art being described in U.S. Pat. No. 2,845,461 (1958) to Winkler et. al. with an improved method described in U.S. Pat. No. 3,478,108 (1969) to Grane, wherein selectivity to the hydroperoxide is increased.

Depending upon the conversion and reaction parameters employed the ratio of the two predominant products (which comprise 90 to 95 mole percent), i.e. tertiary butyl hydroperoxide and tertiary butyl alcohol, can be varied over a relatively wide range. Most commonly the tertiary butyl hydroperoxide will range from about 50 weight percent of the oxidate product up to 70 weight percent with the remainder being predominantly tertiary butyl alcohol and minor amounts generally 1 percent or less each of other oxidation products such as water, methanol, lower molecular weight acids, esters and ketones. This crude oxidate product after unreacted isobutane is removed from the product can be used as feed for the instant process or the tertiary butyl hydroperoxide can be further purified by conventional means. It will be noted that in these runs using tertiary butyl hydroperoxide diluted with tertiary butanol that the reaction rate is decreased somewhat, however, excellent yields are obtainable and the runs demonstrate that the cheap commercial crude tertiary butyl hydroperoxide can be employed.

EXAMPLE VI

To 5 g of titanium sulfate (0.012 moles) was added 1 g of 92 weight percent tertiary butyl hydroperoxide (0.01 moles) a pasty mixture resulted which was heated at 40° C. for 6.5 hours then diluted with 15 g of water and analyzed. A 35 mole percent yield of the peroxytitanium complex was obtained. This run demonstrated that the complex can be produced in the absence of water. This method is not preferred, however, since it is difficult to handle the pasty mixture and a small amount of water improves the rate of reaction to give higher yields in shorter times.

EXAMPLE VII

A mixture of 101 g of titanium sulfate (0.25 moles), 26 g of water, and 24 g of 94 weight percent tertiary butyl hydroperoxide (0.25 moles) was stirred overnight at ambient temperatures, a 68 mole percent conversion of the titanium sulfate to the peroxytitanium complex was obtained. The mixture was extracted 5 times with 100 ml portions of isopentane to remove organic products and the remaining mixture was filtered giving 48.3 g of the red solid peroxytitanium complex. This run demonstrates that it is possible to carry out the reaction at ambient temperatures to give good yields and shows a convenient method for recovering the complex in solid form.

EXAMPLE VIII

A slurry of 75 g of commercial silica gel, 10 g titanium sulfate and 50 g of water was evaporated to dryness on a hot plate with continuous stirring and was then dried in an oven at 110° C. for 2 hours. To 50 g of the dried material was added 52.7 g of 94 weight percent tertiary butyl hydroperoxide with cooling. After standing overnight at ambient temperatures the catalyst was extracted 6 times with 100 ml portions of isopentane and then air dried. This run demonstrates a method of producing a supported peroxytitanium complex which can be utilized as a catalyst in heterogeneous catalytic reactions.

EXAMPLE IX

A run was carried out in the same manner as that in Example VIII except that commercial activated alumina was substituted for the silica gel. A catalyst product consisting of a red peroxytitanium complex on the alumina was obtained.

In the foregoing Examples tertiary butyl hydroperoxide was utilized as the organic hydroperoxide for purposes of side by side comparison, in order to demonstrate, however, that other organic hydroperoxides are equally useful a run was carried out utilizing pure cumene hydroperoxide.

EXAMPLE X

To a slurry of 5 g of titanium sulfate (0.012 moles) and 15 g water was added 1.9 g (0.012 moles) of pure cumene hydroperoxide. The mixture was heated at 60° C. for 1 hour and analysis showed that a 98 mole percent yield of the peroxytitanium complex had been obtained. Heating at 60° C. for an additional hour gave a quantitative (100 percent) yield of the peroxytitanium complex. This run demonstrates the utility of organic hydroperoxides and shows that by utilizing preferred low pH conditions with temperatures in the preferred range quantitative yields of the complex can be obtained.

We claim:

1. A method for the production of peroxytitanium complexes which comprises reacting titanium sulfate with an organic hydroperoxide selected from the group consisting of tertiary butyl hydroperoxide, tertiary amyl hydroperoxide, ethylbenzene hydroperoxide, cyclohexyl hydroperoxide and cumene hydroperoxide, at a pH of below about 1.5 and at a temperature in the range of from 0° to 100°C.

2. The method according to claim 1 wherein the titanium sulfate has the formula $TiOSO_4 \cdot H_2SO_4 \cdot 8H_2O$.

3. The method according to claim 1 wherein the titanium compound is titanium sulfate having the formula $TiOSO_4 \cdot H_2SO_4 \cdot 8H_2O$ and the reaction is carried out in an aqueous medium with the weight ratio of titanium sulfate to water being in the range of from 1:0.2 to 1:20 and at a temperature in the range of from 20° C. to 80° C.

4. The method according to claim 3 wherein the amount of water is adjusted to provide a pH of less than about 0.8.

5. The method according to claim 1 wherein the organic hydroperoxide is tertiary butyl hydroperoxide.

6. The method according to claim 5 wherein the tertiary butyl hydroperoxide is contained in the crude oxidate produced by the thermal oxidation of isobutane with molecular oxygen.

7. The method according to claim 1 wherein the organic hydroperoxide is cumene hydroperoxide.

8. The method according to claim 2 wherein the titanium sulfate in the form of an aqueous slurry is admixed with a solid inert support, dried on said support and thereafter reacted with said organic hydroperoxide to produce said titanium complexes as a deposit on said support.

9. The method according to claim 8 wherein the inert support is selected from the group consisting of silica gel and alumina.

* * * * *